(12) United States Patent
Nielsen

(10) Patent No.: US 9,392,383 B2
(45) Date of Patent: Jul. 12, 2016

(54) COUPLING MEMBER AND HEARING SYSTEM USING IT

(71) Applicant: OTICON A/S, Smørum (DK)

(72) Inventor: Anders Hedelund Nielsen, Smørum (DK)

(73) Assignee: OTICON A/S, Smorum (DK)

( * ) Notice: Subject to any disclaimer, the term of this patent is extended or adjusted under 35 U.S.C. 154(b) by 0 days.

(21) Appl. No.: 14/324,584

(22) Filed: Jul. 7, 2014

(65) Prior Publication Data

US 2015/0010184 A1    Jan. 8, 2015

(30) Foreign Application Priority Data

Jul. 8, 2013 (EP) .................................... 13175543

(51) Int. Cl.
*H04R 25/00* (2006.01)
*F16L 37/098* (2006.01)

(52) U.S. Cl.
CPC ............. *H04R 25/65* (2013.01); *F16L 37/0985* (2013.01); *H04R 25/60* (2013.01); *H04R 2225/77* (2013.01)

(58) Field of Classification Search
CPC ...... H04R 1/1016; H04R 25/60; H04R 25/65; H04R 2225/77; F16L 17/025; F16L 31/00; F16L 17/02; F16L 37/0985
USPC ........................................................ 381/382
See application file for complete search history.

(56) References Cited

U.S. PATENT DOCUMENTS

| | | | | |
|---|---|---|---|---|
| 3,907,342 A | * | 9/1975 | Dudek ................... | F16L 33/22 285/148.13 |
| 4,511,163 A | * | 4/1985 | Harris ................... | A61M 39/10 285/148.16 |
| 4,597,594 A | * | 7/1986 | Kacalieff ............... | F16L 31/00 285/239 |
| 5,449,865 A | * | 9/1995 | Desnick ................. | A61B 7/02 181/131 |
| 5,488,205 A | | 1/1996 | Major | |
| 7,027,608 B2 | * | 4/2006 | Fretz ..................... | H04R 25/65 381/322 |
| 7,502,484 B2 | * | 3/2009 | Ngia ...................... | G10L 15/02 381/312 |
| 8,116,495 B2 | * | 2/2012 | Spaulding ............ | H04R 25/656 181/135 |
| 8,413,331 B2 | * | 4/2013 | Tiemens ............. | B29C 44/1214 128/864 |
| 2009/0041261 A1 | | 2/2009 | Fickweiler et al. | |

* cited by examiner

*Primary Examiner* — Curtis Kuntz
*Assistant Examiner* — Ryan Robinson
(74) *Attorney, Agent, or Firm* — Birch, Stewart, Kolasch & Birch, LLP

(57) ABSTRACT

A coupling member for joining a male member and a female member of a hearing aid device or a hearing diagnosis device is disclosed. The coupling member comprises a male member that comprises two or more annular ribs extending radially from a pipe member having a distal end. The female member comprises a number of cavities configured to receive and contain the annular ribs of the male member. The height of the annular ribs increases as function of the distance from the annular ribs to the distal end of the pipe member.

22 Claims, 5 Drawing Sheets

COUPLING MEMBER AND HEARING SYSTEM USING IT

FIELD OF INVENTION

Figure 1:
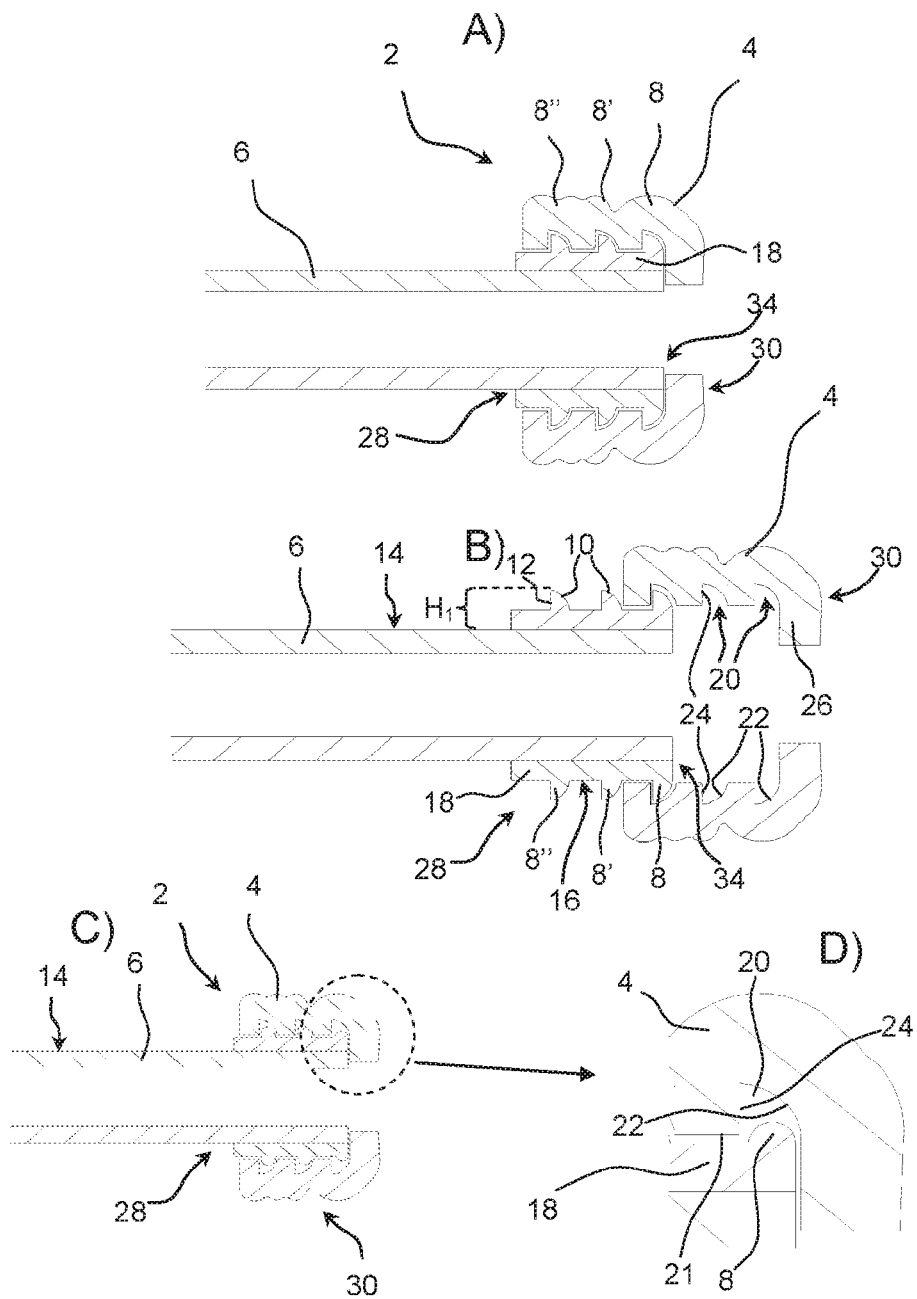

The present invention generally relates to a coupling member for a hearing system, such as a hearing aid device or a hearing diagnosis device. The present invention more particularly relates a coupling member for joining a male member and a female member, where the male member comprises two or more annular ribs extending radially from a pipe member having a distal end, where the female member comprises a number of cavities configured to receive and contain the annular ribs of the male member.

DISCUSSION OF RELATED ART

Today several hearing aids have been developed to correct the hearing of users having different degrees of hearing impairments. A traditional approach to correct hearing impairments is to employ a behind-the-ear (BTE) hearing aid device attached behind the ear or a receiver-in-the-ear (RITE) hearing aid device. The BTE hearing aid devices typically comprises a flexible plastic tube that connects a BTE hearing aid device to a dome that is configured to be placed within the ear. A RITE hearing aid device typically comprises a flexible plastic tube that connects a BTE hearing aid device to a small speaker to which a dome is attached.

The domes used for these purposes normally comprise a number of cavities adapted to receive a male member having a corresponding number (typically three) of radially extending annular ribs. The male member is normally an integrated portion of the speaker (in a RITE hearing aid device) or a sleeve member attached to the distal end of a flexible sound tube (in a BTE hearing aid device).

A dome of this kind occasionally needs to be cleaned by the user of the hearing aid device or to be changed in case of wear. A significant risk that is present during replacement of a dome is the risk of an incomplete mounting of the male member in the cavities of the dome. The problem is that some of the annular ribs of the male member may not be attached to the cavities of the dome. Hereby the strength of the attachment between the male member and the dome is significantly reduced since optimum strength of attachment requires that all the annular ribs of the male member are received by corresponding cavities of the dome.

The dome and the male member configured to be inserted into the dome are subject to wear each time the dome is attached to a male member and each time the dome is unattached from a male member. Wear caused by attaching the dome to a male member or caused by unattaching the dome from a male member reduces the strength of the attachment between the male member and the dome.

Accordingly, in case of incomplete mounting of the male member in the cavities of the dome or in case of wear of the dome or the male member, there is a risk that the dome remains in the ear canal when the user of a BTE hearing aid device attempts to remove the dome from the ear by pulling the flexible plastic tube connecting a BTE hearing aid device to the dome. In the same manner, the dome may get stuck in the ear canal when the user of a RITE hearing aid device attempts to remove the male member of the speaker from the dome by pulling the sound tube that is connected to the remaining part of the hearing aid device.

Thus, there is a need for a coupling member that reduces or even eliminates the above-mentioned disadvantages of the prior art.

SUMMARY OF THE INVENTION

The present invention provides a coupling member that is subject to less wear during use. Moreover, the invention provides an improved coupling member that provides a stronger coupling between the dome and the male member of the tube or between the dome and the male member of the speaker.

The invention can be achieved by a coupling member as defined in claim 1. Preferred embodiments are defined in the dependent sub claims and explained in the following description and illustrated in the accompanying drawings.

The coupling member according to an embodiment of invention is a coupling member for joining a male member and a female member of a hearing aid device or a hearing diagnosis device, where the male member comprises two or more annular ribs extending radially from a pipe member having a distal end, where the female member comprises a number of cavities configured to receive and contain the annular ribs of the male member. The height of the annular ribs increases as function of the distance from the annular ribs to the distal end of the pipe member.

Hereby a better and stronger coupling between the dome and the male member is achieved. Moreover, the coupling member is subject to less wear during use.

The distance from the annular ribs to the distal end of the pipe member equals the distance from the distal end of the pipe member to the place at which the annular ribs are arranged.

The pipe member may be a sound tube or any other type of pipe structure in a hearing aid device or a hearing diagnosis device, e.g. a speaker of a RITE hearing aid device having a canal, through which the sound from the speaker is transmitted.

By the term joining is meant a mechanical attachment e.g. based on the principle of interlocking.

The hearing aid device may in principle be any type of hearing aid device in which the coupling member according to the invention is suitable. The coupling may also be used in a hearing diagnosis device.

The annular ribs are extending radially from a pipe member such that the annular ribs extend basically perpendicular to the pipe member. It is essential that the annular ribs are capable of constituting interlocking means when received by the corresponding cavities of the female member.

The distal end of the pipe member refers to the free end in which annular ribs are provided.

The cavities have such a geometry that they can receive and contain the annular ribs of the male member and hereby provide the required interlocking.

When the height of the annular ribs increases as function of the distance from the annular ribs to the distal end of the pipe member, it means that the annular rib that is arranged closest to the distal end of the pipe member has the smallest height. Moreover, any second annular rib arranged in a larger distance to the distal end of the pipe member than a first annular rib has a larger height than the first annular rib. The annular rib that is arranged adjacent to the annular rib closest to the distal end of the pipe member is higher than the annular rib closest to the distal end of the pipe member.

The height of an annular rib may be measured as the shortest distance from the top of the annular rib to the outer surface of the pipe member onto which the annular rib is provided/arranged.

It is preferred that the male member comprises an elongated sleeve extending parallel to the pipe member and being attached to the pipe member, where the two or more annular ribs are attached to the sleeve.

Hereby it is possible to provide a reliable attachment of a pipe member (e.g. a sound tube) to a female member by attaching the elongated sleeve to the pipe member.

The male member may include an elongated sleeve extending parallel to the pipe member and being attached to the pipe member, where the two or more annular ribs are an integrated part of the sleeve.

Hereby it is ensured that the pipe member is capable of taking up the forces from the female member through the elongated sleeve without causing separation of the elongated sleeve and the pipe member. Hence a very strong and reliable solution can be achieved.

It may be beneficial that the pipe member has a cylindrical geometry and a circular cross-sectional area, and that the sleeve comprises a cylindrical portion configured to be arranged around the pipe member.

Hereby the sleeve can be attached to standard sound tubes.

The male member my include three annular ribs having basically the same width.

It may be an preferred that the elongated sleeve is a separate body that is attached to the pipe member.

It may be preferred that the height of the annular ribs depends linear of the distance from the annular ribs to the distal end of the pipe member.

Hereby a simplified and reliable coupling member can be provided and further the construction of the corresponding cavities of the female member may be eased.

It is preferred that the male member and the female member are configured to be joined by pressing the male member into the female member by a single smooth movement of male member towards the female member without interruption.

Hereby a "one click" attachment procedure is achieved. This is a major advantage compared with the prior art coupling members.

It may be preferred that the widths of the annular ribs correspond to the widths of the surface between annular ribs.

Hereby a strong and compact coupling member can be achieved.

It is preferred that the female member is made in a resilient material, preferably a soft silicone material, or that the annular ribs are made in a resilient material, preferably a soft silicone material.

Hereby, joining of the male member and the female member is eased.

It is preferred that the annular ribs have a saw-tooth profile or a profile with a plane surface and a curved surface.

Hereby a firm attachment can be achieved by interlocking.

It may be preferred that the female member is a dome, preferably an open dome or a closed dome or a power dome or a double dome or a triple dome or a plus dome, since these domes are frequently used domes.

It may be preferred that the female member is a disposable ear-tip configured to be arranged on the hearing aid's speaker unit in order to give a comfortable fit in the ear.

It is preferred that the pipe member is a sound tube of a hearing aid device or a hearing diagnosis device.

It may be preferred that the sound tube is a flexible tube such as a thin tube.

The hearing system according to an embodiment of the invention is a hearing aid device or a hearing diagnosis device comprising a coupling member according to the invention.

It is preferred that the hearing aid device is a BTE hearing aid device or a RITE hearing aid device.

In the present context, a "hearing aid device" refers to a device, such as e.g. a hearing aid, a listening device or an active ear-protection device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears.

A hearing aid device may be configured to be worn in any known way, e.g. as a unit arranged behind the ear with a tube leading air-borne acoustic signals into the ear canal or with a loudspeaker arranged close to or in the ear canal.

A hearing aid device may comprise a single unit or several units communicating electronically with each other. More generally, a hearing aid device comprises an input transducer for receiving an acoustic signal from a user's surroundings and providing a corresponding input audio signal and/or a receiver for electronically receiving an input audio signal, a signal processing circuit for processing the input audio signal and an output means for providing an audible signal to the user in dependence on the processed audio signal. Some hearing aid devices may comprise multiple input transducers, e.g. for providing direction-dependent audio signal processing. In some hearing aid devices, the receiver may be a wireless receiver.

In some hearing aid devices, the receiver may be e.g. an input amplifier for receiving a wired signal. In some hearing aid devices, an amplifier may constitute the signal processing circuit. In some hearing aid devices, the output means may comprise an output transducer, such as e.g. a loudspeaker for providing an air-borne acoustic signal.

BRIEF DESCRIPTION OF ACCOMPANYING DRAWINGS

Figure 2:
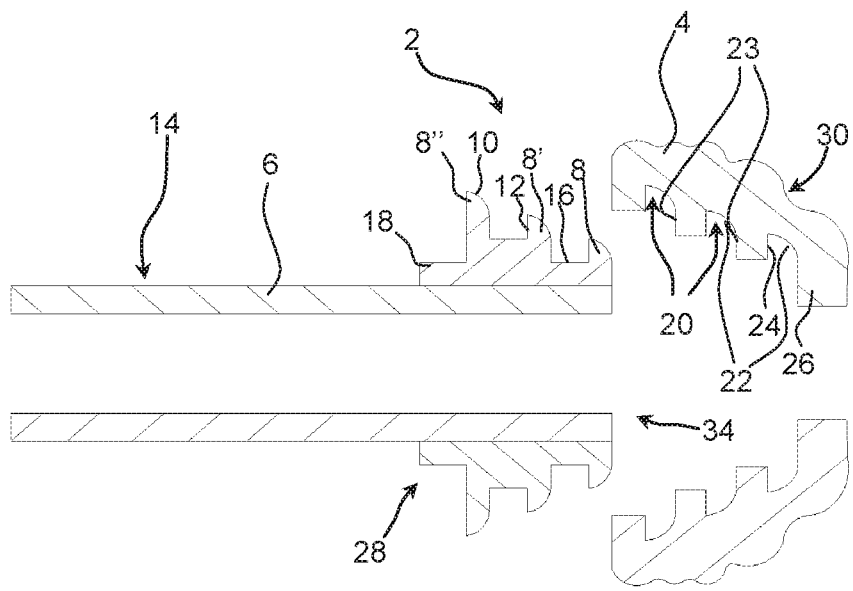
Figure 2:
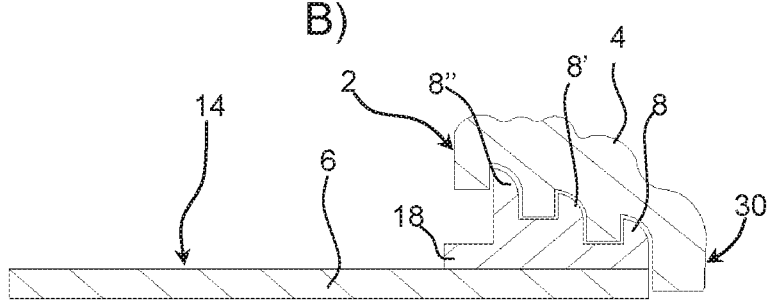
Figure 2:
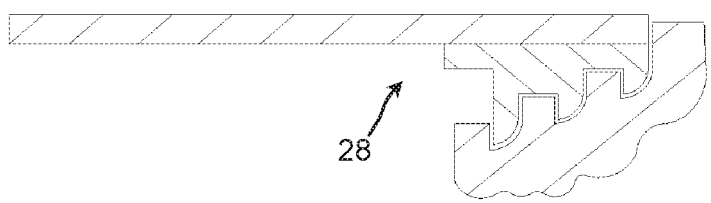
Figure 4:
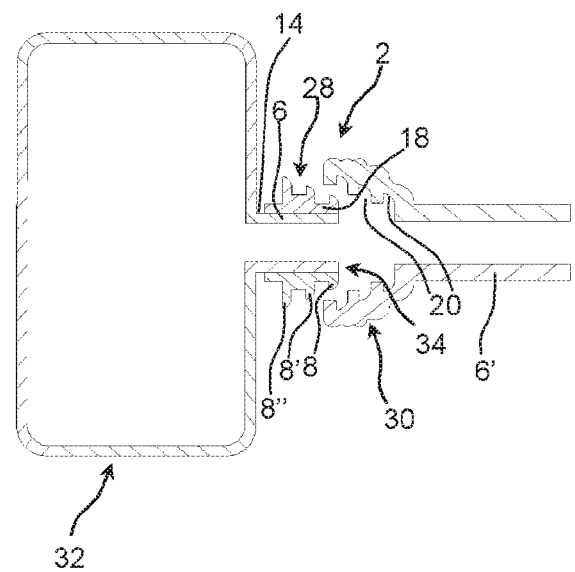
Figure 4:
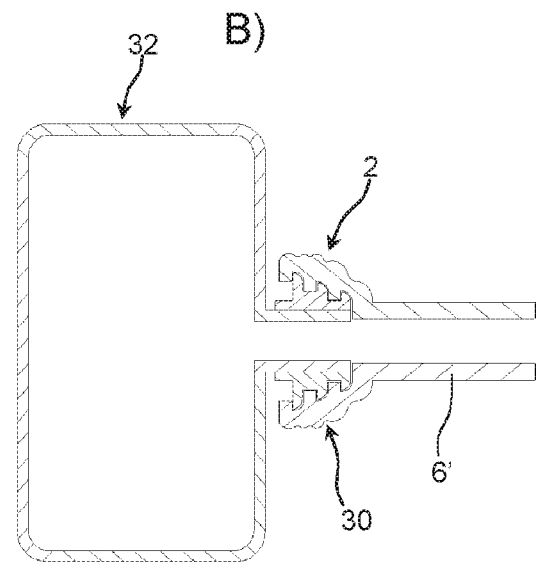

The invention will become more fully understood from the detailed description given herein below. The accompanying drawings are given by way of illustration only, and thus, they are not limitative of the present invention. In the accompanying drawings:

FIG. 1A shows is a schematic cross-sectional view of a prior art coupling member between a sound tube for a hearing aid device and a hearing aid dome; FIG. 1B shows annular ribs of the prior art coupling member, FIG. 1C shows prior art coupling member's annular ribs that are subjected to substantial wear, FIG. 1D shows close up view of the annular ribs that are subjected to substantial wear. different views of a prior art coupling member;

FIG. 2A shows a coupling member where the elongated sleeve of the sound tube is not joined with the hearing aid dome according to an embodiment of the invention, FIG. 2 B) shows a coupling member where the elongated sleeve of the sound tube is joined with the hearing aid dome according to an embodiment of the invention;

FIG. 3A shows a cross-section view of the coupling member where the dome and sound tube are separated according to an embodiment of the invention, FIG. 3B shows a cross-section view of the coupling member where the dome and sound tube are joined according to an embodiment of the invention; FIG. 3C shows a cross-sectional view of the coupling member according to an embodiment of the invention, FIG. 3D shows a cross-sectional view of the coupling member according to another embodiment of the invention;

FIG. 4A shows a cross-sectional view of the coupling member according to an embodiment of the invention, FIG. 4

B) shows a female member of the sound tube and the male member of the sound tube are joined according to an embodiment of the invention; and FIG. 5A shows a close-up cross-sectional view of coupling members shown in FIGS. 2A-2B and FIGS. 4A-4B according to an embodiment of the invention, FIG. 5B shows a close-up view of an elongated sleeve attached to a sound tube according to an embodiment of the invention.

DETAILED DESCRIPTION OF THE INVENTION

Referring now to the drawings for illustrating embodiments of the invention, different views of a prior art coupling member 2 between a sound tube 6 for a hearing aid device and a hearing aid dome 4 is illustrated in FIG. 1.

FIG. 1A) is a schematic cross-sectional view of a prior art coupling member 2. The coupling member 2 comprises a sound tube 6 having a distal end 34 to which an elongated sleeve 18 is attached. The elongated sleeve 18 constitutes a male member 28 that is attached to a female member 30 formed as a hearing aid dome 4. The elongated sleeve 18 has a first annular rib 8, a second annular rib 8' and a third annular rib 8".

In FIG. 1B) it can be seen that all the three annular ribs 8, 8', 8" have the same height $H_1$ relative to the first base surface 14 of the sound tube 6. It can also be seen that the annular ribs 8, 8', 8" have the same shape and that each of them comprise a plane surface 12 and an angled or tapered surface 10. A plane surface 16 is provided between each pair of adjacent ribs 8, 8', 8". The female member 30 is formed as a hearing aid dome 4 and comprises three cavities 20 that are configured to receive the three annular ribs 8, 8', 8". The cavities 20 each have a plane surface 24 and a concave surface 22.

Moreover, the hearing aid dome 4 has a stop member 26 adapted to restrict further movement of the elongated sleeve 18 when it has entered the end portion of the hearing aid dome 4 and bears against the stop member 26. The cavities 20 each comprise a plane surface 24 configured to receive the corresponding plane surface 12 of the corresponding annular ribs 8, 8', 8".

A problem that typically arises when using a prior art coupling member 2, as the one shown in FIG. 1 is, that only some of the annular ribs 8, 8', 8" are inserted into the hearing aid dome 4 (like illustrated in FIG. 1 B)—accordingly, the distal end 34 of the sound tube 6 has not been properly inserted into the hearing aid dome 4. When this occurs, there is a risk that the hearing aid dome 4 gets stuck in the ear canal of the user, when the user of the hearing aid pulls the sound tube 6 in order to remove the hearing aid dome 4 from the ear canal. Therefore, it is a significant problem of the prior art that the hearing aid dome 4 can get stuck in the ear canal of the user.

Moreover, as time goes by the annular ribs 8, 8', 8" are subject to substantial wear that causes erosion of the annular ribs 8, 8', 8". This is illustrated in FIG. 1 C) and in the corresponding close-up view FIG. 1 D). It can be seen that the annular ribs 8, 8', 8" in FIGS. 1 C) and 1 D) have a more "round off" geometry compared with the annular ribs 8, 8', 8" in FIGS. 1 A) and 1 B). This means that the interlocking coupling between the sound tube 6 and the hearing aid dome 4 becomes weaker and weaker as the annular ribs 8, 8', 8" are subject to wear. It is important to note that the wear may also occur at the dome 4, especially at the surfaces 21, 24 (not shown in FIG. 1).

Figure 5:
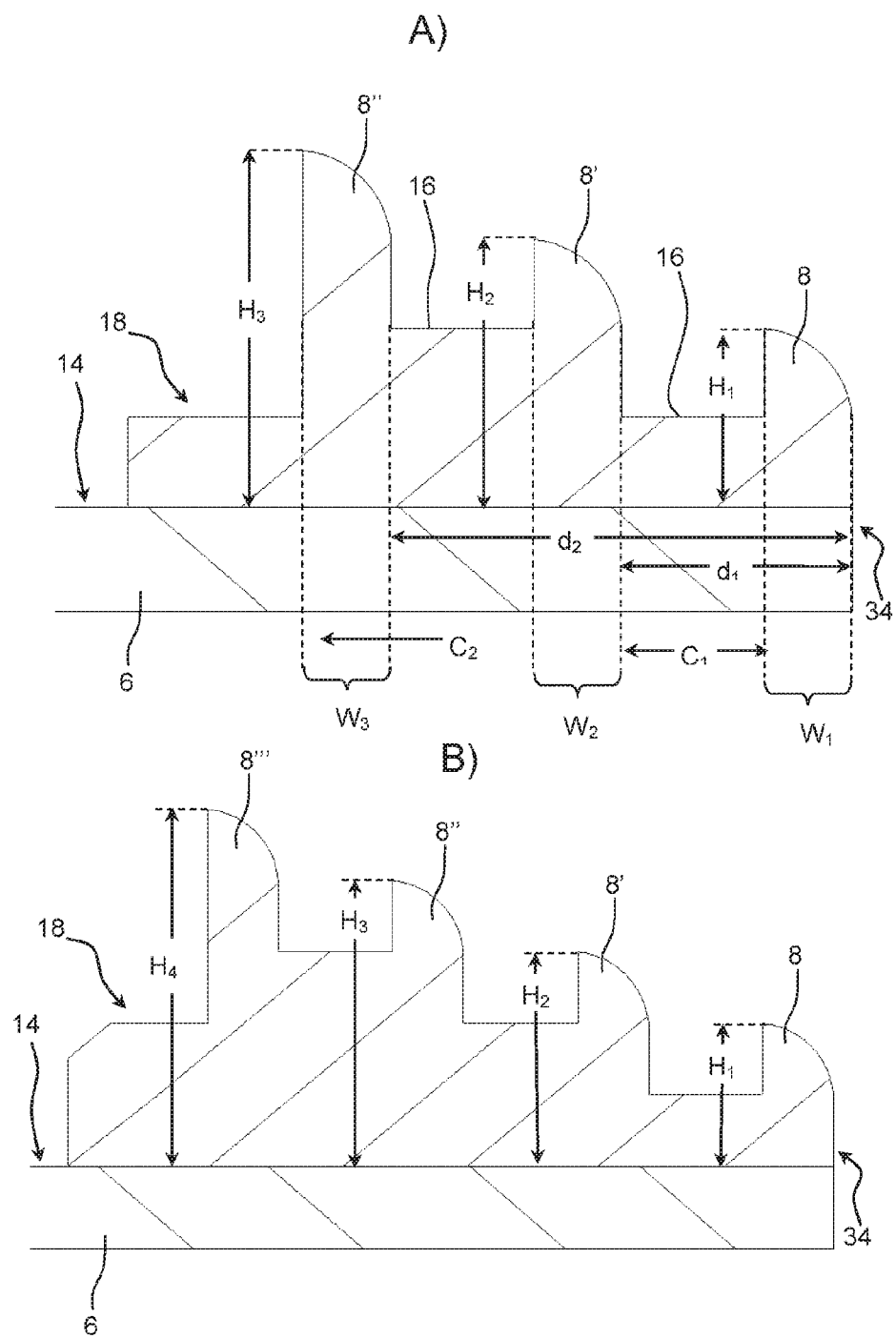

FIG. 2 illustrates a cross-sectional view of a coupling member 2 according to the invention. The coupling member 2 is used to join a sound tube 6 for a hearing aid and a hearing aid dome 4 according to the invention. The sound tube 6, has an outer surface 14. At the distal end 34 of the tube 6 an elongated sleeve 18 is attached. The elongated sleeve 18 comprises a first annular rib 8, a second annular rib 8' and a third annular rib 8" and constitutes a male member. A close-up cross-sectional view is shown in FIG. 5 A), and here the height $H_1$ of the first annular rib 8 is smaller than the height $H_2$ of the second annular rib 8' and that the height $H_3$ of the a third annular rib 8" is larger than the height $H_2$ of the a second annular rib 8'. Each annular rib 8, 8', 8" comprises a plane surface 12 and an angled or tapered surface 10.

The hearing aid dome 4 constitutes a female member 30 having three cavities 20 each comprising a concave surface 22, a side wall 23 and a plane surface 24. The female member 30 is shaped as a hearing aid dome 4 having three cavities 20 configured to receive the annular rib 8, 8', 8" of the elongated sleeve 18. The stop member 26 as well as the side walls 23 of the cavities 20, prevent the elongated sleeve 18 from being entered further into the dome 4.

In FIG. 2 B) the elongated sleeve 18 of the sound tube 6 has been joined with the hearing aid dome 4. By using the illustrated coupling member 2 according to the invention it is possible to provide a secure coupling of the sound tube 6 and the hearing aid dome 4 by pressing together the sound tube 6 and the hearing aid dome in one smooth movement, where the annular ribs 8, 8', 8" are received by corresponding cavities 20 of the dome 4.

Figure 3:
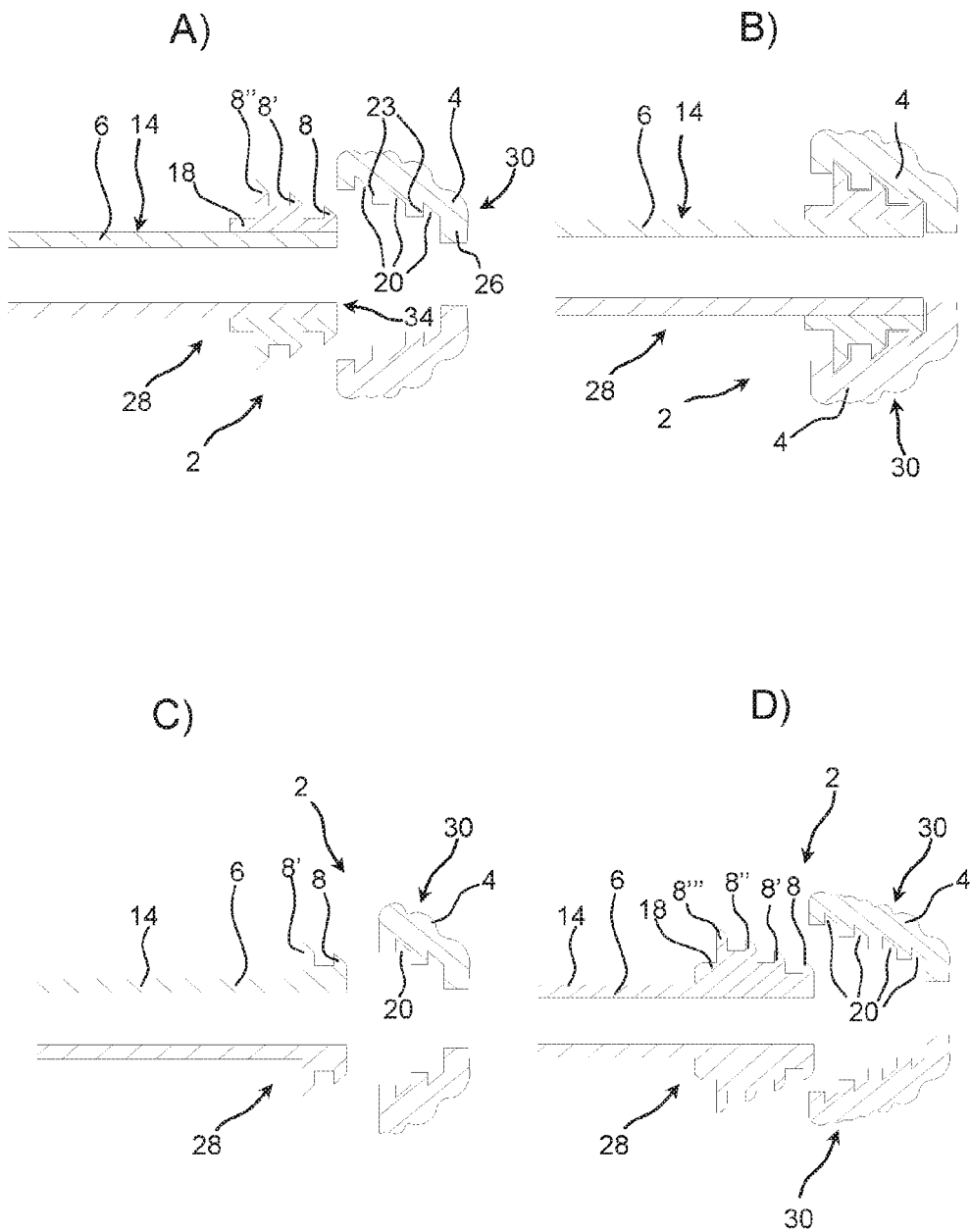

FIG. 3 A) and FIG. 3 B) illustrate cross-sectional views of another embodiment of a coupling member 2 according to the invention. The coupling member 2 comprises a sound tube 6 having an outer surface 14. At the distal end 34 of the sound tube 6 an elongated sleeve 18 is attached. The elongated sleeve 18 comprises a first annular rib 8, a second annular rib 8' and a third annular rib 8". The elongated sleeve 18 constitutes a male member 28 and the profile of the annular ribs 8, 8', 8" are saw-tooth shaped.

The coupling member 2 also comprises a hearing aid dome 4 that constitutes a female member 30 provided with three cavities 20 corresponding to the geometry of the annular ribs 8, 8', 8". Thus, the three cavities 20 are configured to receive the annular rib 8, 8', 8" of the elongated sleeve 18. The dome 4 comprises a stop member 26 as well as side walls 23 of each of the cavities 20. The stop member 26 and the side walls 23 prevent the elongated sleeve 18 from being entered further into the dome 4.

The dome 4 and the sound tube 6 are separated in FIG. 3 A) and joined in FIG. 3 B).

FIG. 3 C) illustrates a cross-sectional view of one embodiment of a coupling member 2 according to the invention. The coupling member 2 basically corresponds to the coupling member 2 shown in FIGS. 3 A) and 3 B), however; the sound tube 6 has an elongated sleeve 18 that comprises only two annular ribs 8, 8' (a first annular rib 8 and a second annular rib 8') that are saw-tooth shaped. The elongated sleeve 18 and the sound tube 6 are integrated into a one-piece body.

FIG. 3 D) on the other hand illustrates a cross-sectional view of an alternative embodiment of a coupling member 2 according to the invention. The coupling member 2 has a sound tube 6 provided with an elongated sleeve 18 that comprises a first annular rib 8, a second annular rib 8', third annular rib 8" and a fourth annular rib 8'". The annular ribs 8, 8', 8", 8'" are saw-tooth shaped, however wear has rounded-off the annular ribs 8, 8', 8", 8'". The elongated sleeve 18 and the sound tube 6 are integrated into a one-piece body.

FIG. 4 A) illustrates a cross-sectional view of another embodiment of a coupling member 2 according to the invention. The coupling member 2 comprises a sound tube 6' provided with a female member 30 basically corresponding to the female member 30 illustrated in FIG. 2. A male member 28 is attached to a sound tube 6 that is connected to a hearing aid casing 32. An elongated sleeve 18 that comprises a first annular rib 8, a second annular rib 8' and a third annular rib 8" is attached to the sound tube 6. It can be seen that the height of the annular ribs 8, 8', 8" increases as function of the distance from the annular ribs 8, 8', 8" to the distal end 34 of the sound tube 6. The distance is measured from the distal end 34 of the sound tube 6 to place at which the annular ribs 8, 8', 8" are arranged.

In FIG. 4 B) the female member 30 of the sound tube 6' and the male member 28 of the sound tube 6 connected to the hearing aid case 32 are joined. It can be seen that the annular ribs 8, 8', 8" a received by the cavities 20 of the female member 30.

FIG. 5 A) illustrates a close-up view of the elongated sleeve 18 shown in FIG. 2 and in FIG. 4. The elongated sleeve 18 is attached to a sound tube 6 and the elongated sleeve 18 comprises a first annular rib 8, a second annular rib 8' and a third annular rib 8". The height $H_1$, $H_2$, $H_3$ of the annular ribs 8, 8', 8" increases as function of the distance from the distal end 34 of the sound tube 6. The height $H_1$, $H_2$, $H_3$ of the annular ribs 8, 8', 8" are measured from the outer surface 14 of the sound tube.

The first annular rib 8 is arranged closest to the distal end 34 of the sound tube 6. In fact the first annular rib 8 is arranged at the distal end 34 of the sound tube 6 and thus the height $H_1$ of the first annular rib 8 is smaller than the height $H_2$ of the second annular rib 8' that is arranged in a first non-zero distance $d_1$ to the to the distal end 34 of the sound tube 6. The third annular rib 8" is arranged in a second non-zero distance $d_2$ from the distal end 34 of the sound tube 6. Since the second distance $d_2$ is larger than the first distance $d_1$ from the distal end 34 of the sound tube 6, the height $H_3$ of the third annular rib 8" is larger than the height $H_2$ of the second annular rib 8'.

The width $W_1$ of the first annular rib 8 corresponds to the width $W_2$ of the second annular rib 8' and to the width $W_3$ of the third annular rib 8". The plane surface 16 between the first annular rib 8 and the second annular rib 8' has a width $C_1$ that corresponds to the width $C_2$ of the plane surface 16 between the second annular rib 8' and the third annular rib 8". It can be seen that $$d_1 = W_1 + C_1 \text{ and that} \tag{a}$$

$$d_2 = d_1 + W_2 + C_2 \tag{b}$$

FIG. 5 B) illustrates a close-up view of an elongated sleeve 18 attached to a sound tube 6. The elongated sleeve 18 comprises a first annular rib 8, a second annular rib 8', a third annular rib 8" and a fourth annular rib 8'''. The height $H_1$, $H_2$, $H_3$, $H_4$ of each of the annular ribs 8, 8', 8", 8''' (measured from the outer surface 14 of the sound tube) increases as function of the distance from the ribs 8, 8', 8", 8''' to the distal end 34 of the sound tube 6.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims that follow.

LIST OF REFERENCE NUMERALS

2 Coupling member
4 Dome
6, 6' Tube
8, 8', 8" Annular rib
10 Angled or tapered surface
12 Plane surface
14 Surface
16 Surface
18 Elongated sleeve
20 Cavity
21 Surface
22 Concave surface
23 Side wall
24 Plane surface
26 Stop member
28 Male member
30 Female member
32 Hearing aid case
34 Distal end
$H_1$, $H_2$, $H_3$, $H_4$ Height
$W_1$, $W_2$, $W_3$ Width
$C_1$, $C_2$ Width
$d_1$, $d_2$ Distance

The invention claimed is:

1. A coupling member for joining a male member and a female member of a hearing aid device or a hearing diagnosis device, the coupling member comprising:
   the male member including
      a pipe member having a distal end, and
      two or more annular ribs extending radially from the pipe member, each annular rib having a maximum height measured radially from the pipe member, the maximum height of a respective annular rib being a function of a distance to the respective annular rib from the distal end of the pipe member and increasing as the distance increases; and
   the female member including
      a central axis, and
      a number of cavities matching the annular ribs and configured to receive and contain the annular ribs of the male member such that a maximum depth of the cavities measured from the central axis increases to match the increasing maximum height of the annular ribs.

2. The coupling member according to claim 1, wherein the male member comprises an elongated sleeve extending parallel to the pipe member and being attached to the pipe member, where the two or more annular ribs are attached to the sleeve.

3. The coupling member according to claim 1, wherein the male member comprises an elongated sleeve extending parallel to the pipe member and being attached to the pipe member, where the two or more annular ribs are an integrated part of the sleeve.

4. The coupling member according to claim 1, wherein the pipe member has a cylindrical geometry and a circular cross-sectional area, and
the sleeve comprises a cylindrical portion configured to be arranged around the pipe member.

5. The coupling member according to claim 1, wherein the male member comprises three annular ribs having basically the same width.

6. The coupling member according to claim 1, wherein the maximum height of the annular ribs depends linearly on the distance from the annular ribs to the distal end of the pipe member.

7. The coupling member according to claim 1, wherein the male member and the female member are configured to be joined by pressing the male member into the female member by a single smooth movement of male member towards the female member without interruption.

8. The coupling member according to claim 1, wherein widths of the annular ribs correspond to widths of the surface between annular ribs.

9. The coupling member according to claim 1, wherein the female member is made in a resilient material, or the annular ribs are made in a resilient material.

10. The coupling member according to claim 1, wherein the annular ribs have a saw-tooth profile or a profile with a plane surface and a curved surface.

11. The coupling member according to claim 1, wherein the female member is adapted for placement in the ear canal of a hearing aid user, and comprises a dome.

12. The coupling member according to claim 1, wherein the pipe member is a sound tube of a hearing aid device or a hearing diagnostic device.

13. The coupling member according to claim 12, wherein the sound tube is a flexible tube.

14. A hearing aid device or a hearing diagnosis device comprising a coupling member according to claim 1.

15. A hearing aid device according to claim 14, wherein the hearing aid device is a behind-the-ear (BTE) hearing aid device or a receiver-in-the-ear (RITE) hearing aid device.

16. A hearing aid device or a hearing diagnosis device comprising a coupling member according to claim 2.

17. A hearing aid device or a hearing diagnosis device comprising a coupling member according to claim 3.

18. A hearing aid device or a hearing diagnosis device comprising a coupling member according to claim 4.

19. A hearing aid device or a hearing diagnosis device comprising a coupling member according to claim 5.

20. A hearing aid device or a hearing diagnosis device comprising a coupling member according to claim 6.

21. The coupling member according to claim 1, wherein
the male member includes at least three annular ribs and a plurality of hollow cylindrical portions,
each hollow cylindrical portion is positioned between adjacent annular ribs and has an outer radius that is substantially constant over an entire length of the cylindrical portion, and
the outer radius of a respective hollow cylindrical portion is a function of a distance to the respective hollow cylindrical portion from the distal end of the pipe member and increases as the distance increases.

22. The coupling member according to claim 1, wherein
the female member includes a plurality of inward protruding cylinders centered on the central axis,
each inward protruding cylinder is positioned immediately adjacent to at least one of the cavities and has an inner radius that is substantially constant over an entire length of the inward protruding cylinder, and
the inner radius of a respective inward protruding cylinder is a function of a distance to the respective inward protruding cylinder from a location on the female member corresponding to the distal end of the pipe member when the male member and the female member are coupled together and the inner radius increases as the distance increases.

* * * * *